US011042765B2

(12) United States Patent
Yoshizaki et al.

(10) Patent No.: US 11,042,765 B2
(45) Date of Patent: Jun. 22, 2021

(54) SYSTEMS AND METHODS FOR PLAYING VEHICLE MONITORED CONTENT IN A VEHICLE

(71) Applicant: Toyota Motor Engineering & Manufacturing North America, Inc., Plano, TX (US)

(72) Inventors: Coh L. Yoshizaki, Wixom, MI (US); John-Michael McNew, Ann Arbor, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 0 days.

(21) Appl. No.: 16/411,597

(22) Filed: May 14, 2019

(65) Prior Publication Data
US 2020/0364476 A1 Nov. 19, 2020

(51) Int. Cl.
*G06K 9/00* (2006.01)
*B60R 1/00* (2006.01)
*B60W 50/14* (2020.01)

(52) U.S. Cl.
CPC ............ *G06K 9/00845* (2013.01); *B60R 1/00* (2013.01); *B60W 50/14* (2013.01); *B60R 2300/20* (2013.01)

(58) Field of Classification Search
CPC .......... G06K 9/00845; G06K 9/00832; B60W 50/14; B60R 1/00; B60R 2300/20
See application file for complete search history.

(56) References Cited

U.S. PATENT DOCUMENTS

| 5,680,123 A * | 10/1997 | Lee .......................... B60Q 1/52 340/937 |
| 6,917,693 B1 | 7/2005 | Kiridena et al. |
| 8,301,108 B2 * | 10/2012 | Naboulsi ............... B60R 16/023 455/345 |
| 10,025,383 B2 | 7/2018 | McNew |
| 10,322,675 B2 * | 6/2019 | Naboulsi ................ H04N 5/445 |
| 2002/0140562 A1 * | 10/2002 | Gutta .................. G06K 9/00597 340/576 |
| 2003/0137586 A1 | 7/2003 | Lewellen |
| 2005/0073136 A1 * | 4/2005 | Larsson .................. A61B 5/163 280/735 |

(Continued)

*Primary Examiner* — Ryan W Sherwin
(74) *Attorney, Agent, or Firm* — Christopher G. Darrow; Darrow Mustafa PC (57) ABSTRACT

In one embodiment, a safety system for playing vehicle monitored content in a vehicle while minimizing driver distraction is provided. When the driver selects a camera, such as a rear view camera, vehicle monitored content stream from the camera is displayed on a display in the vehicle. While the driver drives the vehicle, the eye-gaze of the driver is monitored. When the eye-gaze of the driver shows that the driver is looking at the display, a timer is started. The timer runs when the driver looks at the display. When the eye-gaze of the driver shows that the driver has looked at the road continuously for more than a threshold amount of time, the time associated with the vehicle monitored content is reset back to its initial value. If the timer runs out, indicating that the driver has been watching the vehicle monitored content too much without also looking at the road, the vehicle monitored content is stopped and the driver is prevented from watching the vehicle monitored content for some period of time.

20 Claims, 5 Drawing Sheets

(56) References Cited

U.S. PATENT DOCUMENTS

| | | | |
|---|---|---|---|
| 2012/0200490 A1* | 8/2012 | Inada | G06F 3/013 345/156 |
| 2012/0215403 A1 | 8/2012 | Tengler et al. | |
| 2012/0300061 A1 | 11/2012 | Osman et al. | |
| 2015/0010207 A1* | 1/2015 | Inada | G06K 9/00845 382/103 |
| 2016/0185219 A1* | 6/2016 | Sakata | B60K 35/00 701/36 |
| 2016/0311323 A1* | 10/2016 | Lee | B60K 35/00 |
| 2019/0027141 A1* | 1/2019 | Strong | G06F 3/013 |
| 2019/0056782 A1* | 2/2019 | Rao | B60Q 3/76 |

\* cited by examiner

SYSTEMS AND METHODS FOR PLAYING VEHICLE MONITORED CONTENT IN A VEHICLE

TECHNICAL FIELD

The subject matter described herein relates, in general, to systems and methods for playing vehicle monitored content in a vehicle, and, in particular, to monitoring the eye-gaze of a driver to determine if the driver is watching vehicle monitored content, and for disabling the vehicle monitored content if the driver watches the vehicle monitored content for too long.

BACKGROUND

Cameras on vehicles are quickly becoming a standard feature. These cameras allow a driver to view a vehicle monitored content stream provided by the camera on a display typically found in the console of the vehicle. As used herein, vehicle monitored content includes any content which evolves over time and gives situational awareness of the surroundings and/or interior of the vehicle. Vehicle monitored content could refer to live video camera feeds, sequential snapshots or animations of external and internal objects (pedestrians, passenger avatars, etc.). Such content is intended to increase driver awareness, but in many cases it is desirable to limit the amount of time the driver looks away from the road to consume such content.

While the vehicle monitored content provided by cameras includes useful information for drivers, its use is currently restricted in most vehicles. With respect to rear view cameras, these cameras are only activated when the vehicle is in reverse and otherwise not available for the driver to view. With respect to side view cameras, these cameras are only activated when the user activates a turn signal associated with the vehicle.

The reasoning behind restricting camera viewing is that were vehicle monitored content from cameras be made available at all times, the drivers would become distracted and more prone to having accidents. Therefore, what is needed is way to allow for the use of cameras by drivers, while still ensuring that drivers stay focused on driving and the road ahead.

SUMMARY

In one embodiment, a safety system for playing vehicle monitored content in a vehicle while minimizing driver distraction is provided. When the driver selects a camera, such as a rear view camera, a vehicle monitored content stream from the camera is displayed on a display in the vehicle. While the driver drives the vehicle, the eye-gaze of the driver is monitored. When the eye-gaze of the driver shows that the driver is looking at the display, a timer is started. The timer runs when the driver looks at the display. When the eye-gaze of the driver shows that the driver has looked at the road continuously for more than a threshold amount of time, the timer associated with the vehicle monitored content is reset back to its initial value. If the timer runs out, indicating that the driver has been watching the vehicle monitored content too much without also looking at the road, the vehicle monitored content is stopped and the driver is prevented from watching the vehicle monitored content for some period of time.

As will be described further below, the safety system solves may of the problems associated with viewing vehicle monitored content in a vehicle. First, because the amount of time that the driver can view the vehicle monitored content while driving is controlled using a timer that runs based on the eye-gaze of the driver, the amount of time that the driver can be continuously distracted by the vehicle monitored content is fixed. Second, because the timer can only be reset by the driver focusing on the road for a threshold amount of time, the driver is forced to periodically re-focus on the road to earn additional time to view the vehicle monitored content. Accordingly, using the safety system described herein, drivers can be permitted to view vehicle monitored content without fear of excessive distraction.

In one embodiment, a system for playing vehicle monitored content in a vehicle is provided. The system includes one or more processors and a memory communicably coupled to the one or more processors and storing a vehicle monitored content module, an eye-gaze module, and a timer module. The vehicle monitored content module includes instructions that when executed by the one or more processors cause the one or more processors to play vehicle monitored content on a display inside of a vehicle. The eye-gaze module includes instructions that when executed by the one or more processors cause the one or more processors to monitor an eye-gaze of a driver of the vehicle. The timer module includes instructions that when executed by the one or more processors cause the one or more processors to: when the monitored eye-gaze indicates that the driver is looking at the display, cause a timer to run; when the monitored eye-gaze indicates that the driver is not looking at the display, cause the timer to stop; determine that the timer has expired; and in response to determining that the timer has expired, stop the vehicle monitored content from playing on the display inside of the vehicle.

Implementations may include some or all of the following features. The eye-gaze module may further include instructions that when executed by the one or more processors cause the one or more processors to: when the monitored eye-gaze indicates that the driver is looking at a road ahead of the vehicle: determine that the driver has been continuously looking at the road ahead for more than a threshold time; and in response to determining that the driver has been continuously looking at the road ahead for more than the threshold time, reset the timer. The threshold time may be three seconds. The timer may be three seconds. The vehicle monitored content module may further include instructions that when executed by the one or more processors cause the one or more processors to: stream the vehicle monitored content from a camera associated with the vehicle. The vehicle monitored content module may further include instructions that when executed by the one or more processors cause the one or more processors to: receive a selection of a camera of a plurality of cameras associated with the vehicle; and play vehicle monitored content associated with the selected camera inside the vehicle. The timer module further includes instructions that when executed by the one or more processors cause the one or more processors to: in response to determining that the timer has stopped, display a reminder to the driver of the vehicle to watch the road.

In one embodiment, a method for playing vehicle monitored content in a vehicle is provided. The method includes: playing vehicle monitored content on a display inside a vehicle; monitoring an eye-gaze of a driver of the vehicle; when the monitored eye-gaze indicates that the driver is looking at the display, causing a timer to run; when the monitored eye-gaze indicates that the driver is not looking at the display, causing the timer to stop; determining that the timer has expired; and in response to determining that the timer has expired, stopping the vehicle monitored content from playing on the display inside of the vehicle.

Implementations may include some or all of the following features. The method may further include: when the monitored eye-gaze indicates that the driver is looking at a road ahead of the vehicle: determining that the driver has been continuously looking at the road ahead for more than a threshold time; and in response to determining that the driver has been continuously looking at the road ahead for more than the threshold time, resetting the timer. The threshold time may be three seconds. The timer may be three seconds. The vehicle monitored content may be streamed from a camera associated with the vehicle. The method may further include receiving a selection of a camera of a plurality of cameras associated with the vehicle, and playing vehicle monitored content associated with the selected camera inside the vehicle. The method may further include: in response to determining that the timer has stopped, displaying a reminder to the driver of the vehicle to watch the road.

In one embodiment, a non-transitory computer-readable medium for playing vehicle monitored content in a vehicle is provided. The medium includes instructions that when executed by one or more processors cause the one or more processors to: play vehicle monitored content on a display inside a vehicle; monitor an eye-gaze of a driver of the vehicle; when the monitored eye-gaze indicates that the driver is looking at the display, causing a timer to run; when the monitored eye-gaze indicates that the driver is not looking at the display, cause the timer to stop; determine that the timer has expired; and in response to determining that the timer has expired, stop the vehicle monitored content from playing on the display inside of the vehicle.

Implementations may include some or all of the following features. The medium may further include instructions that when executed by one or more processors cause the one or more processors to: when the monitored eye-gaze indicates that the driver is looking at a road ahead of the vehicle: determine that the driver has been continuously looking at the road ahead for more than a threshold time; and in response to determining that the driver has been continuously looking at the road ahead for more than the threshold time, reset the timer. The threshold time may be three seconds. The timer may be three seconds. The vehicle monitored content may be streamed from a camera associated with the vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
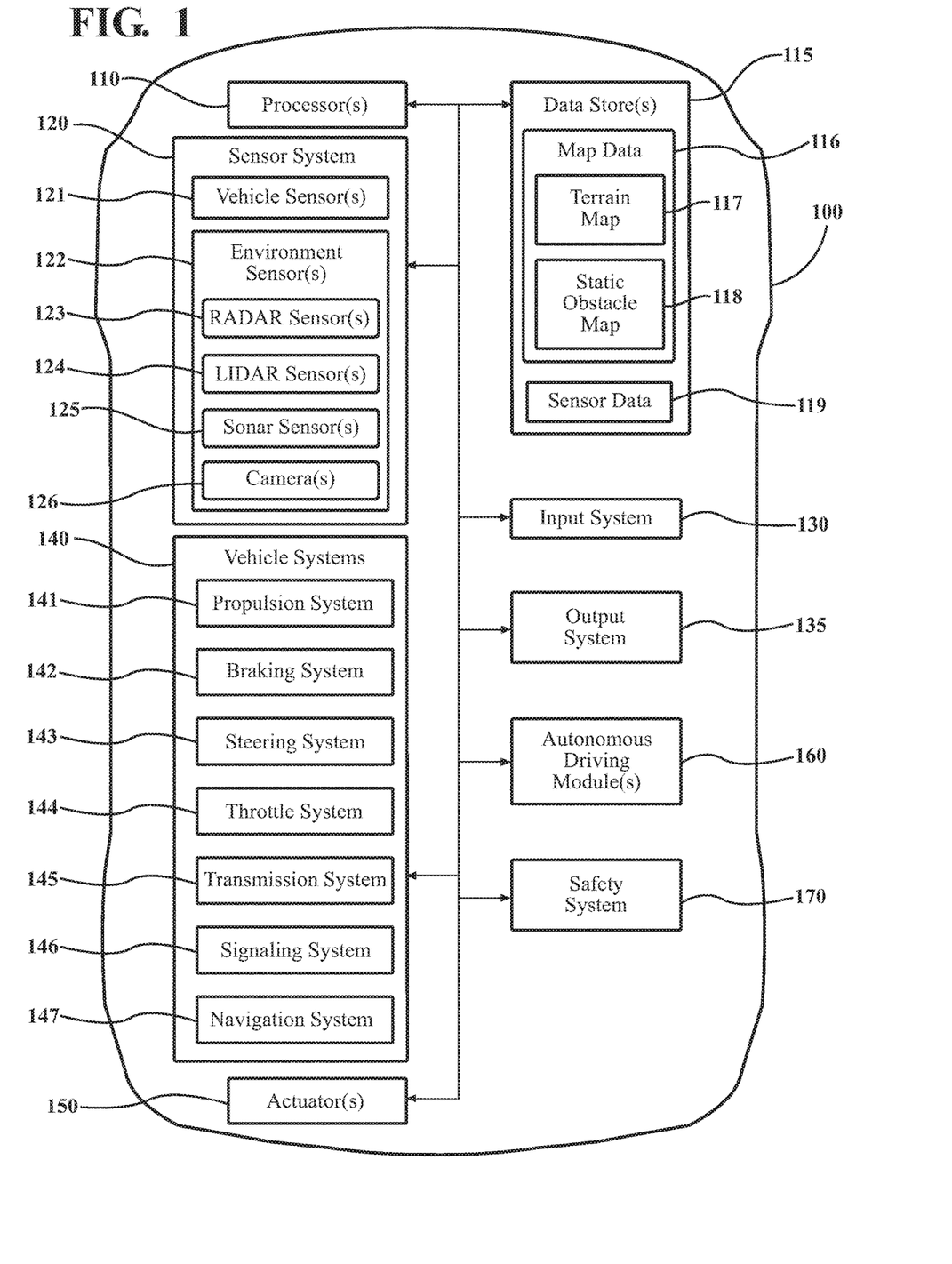
FIG. 1 illustrates one embodiment of a vehicle within which systems and methods disclosed herein may be implemented.

With regards to FIG. 1, a vehicle 100 includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes the safety system 170 that is implemented to enable or disable the playing of vehicle monitored content on a display of the vehicle 100 based on driver eye-gaze. The noted functions and methods will become more apparent with a further discussion of the figures.

Figure 2:
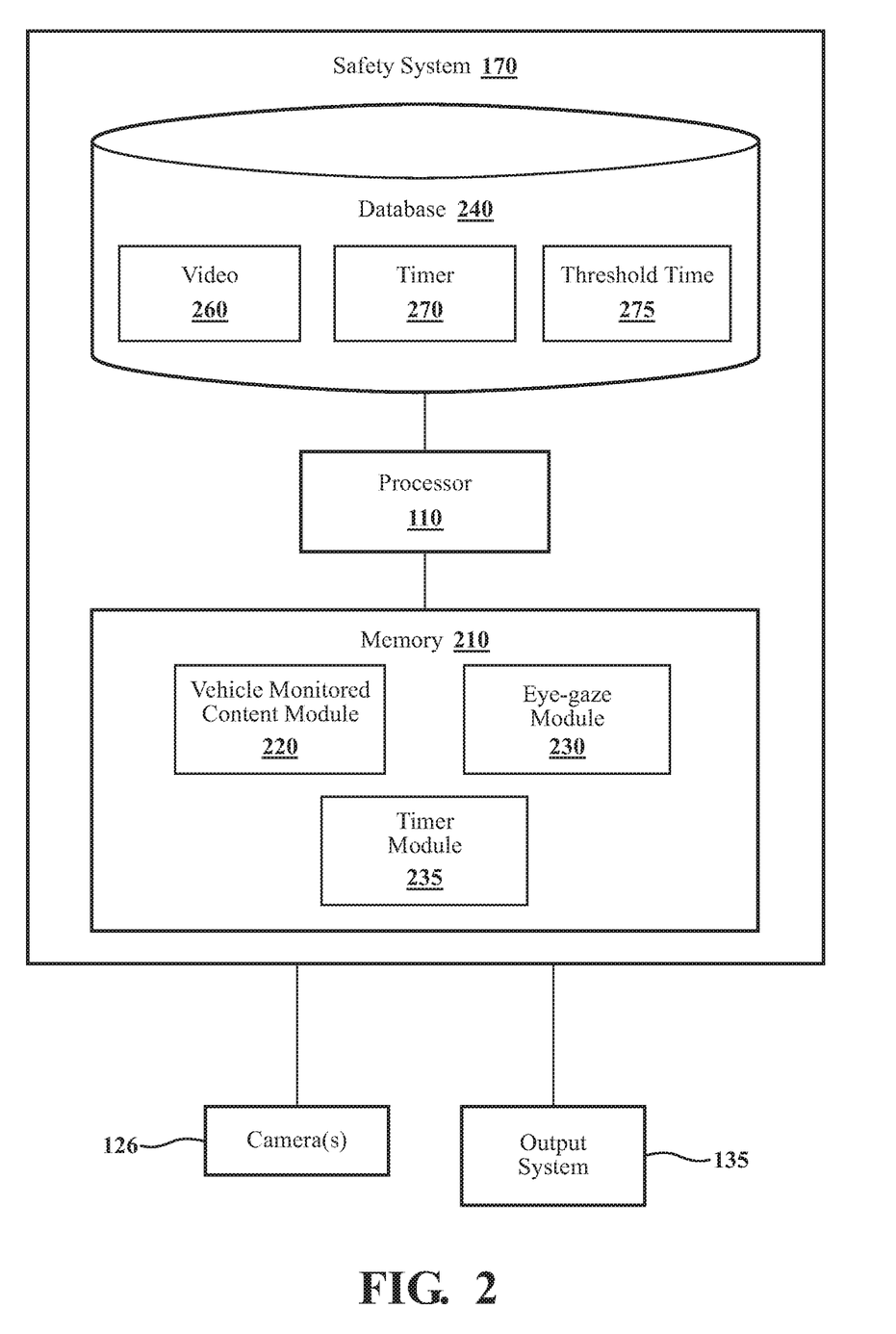
FIG. 2 illustrates one embodiment of a safety system.

With reference to FIG. 2, one embodiment of the safety system 170 of FIG. 1 is further illustrated. The safety system 170 is shown as including a processor 110 from the vehicle 100 of FIG. 1. Accordingly, the process or 110 may be a part of the safety system 170, the safety system 170 may include a separate processor from the processor 110 of the vehicle 100, or the safety system 170 may access the processor 110 through a data bus or another communication path. It should be appreciated, that while the safety system 170 is illustrated as being a single contained system, in various embodiments, the safety system 170 is a distributed system that is comprised of components that can be provided as a centralized server, a cloud-based service, and so on.

In one embodiment, the safety system 170 includes a memory 210 that stores a vehicle monitored content module 220, an eye-gaze module 230, and a timer module 235. The memory 210 is a random-access memory (RAM), read-only memory (ROM), a hard-disk drive, a flash memory, or other suitable memory for storing the modules 220, 230, and 235. The modules 220, 230, and 235 are, for example, computer-readable instructions that when executed by the processor 110 cause the processor 110 to perform the various functions disclosed herein. Moreover, as previously noted, in various embodiments, one or more aspects of the safety system 170 are implemented as cloud-based services, and so on. Thus, one or more modules of the safety system 170 may be located remotely from other components and may be implemented in a distributed manner.

Furthermore, in one embodiment, the safety system 170 includes the database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220, 230, and 235 in executing various functions. In one embodiment, the database 240 includes vehicle monitored content 260 along with, for example, other information that is used and/or generated by the modules 220, 230, and 235 such as a timer 270 and a threshold time 275. Of course, in further embodiments, the various information may be stored within the memory 210 or another suitable location.

The vehicle monitored content module 220 is configured to display vehicle monitored content 260 inside of a vehicle 100. The vehicle monitored content module 220 may display the vehicle monitored content 260 through the output system 135 of the vehicle 100. The output system 135 may include a display arranged inside of the vehicle 100. Depending on the embodiment, the display may be integrated into the vehicle 100 such as the dashboard or console of the vehicle 100. The display may be an LCD display, however other display technologies may be used. The vehicle monitored content 260 may be a vehicle monitored content stream, and may be received from one or more cameras 126 associated with the vehicle 100. The cameras 126 may include rear view cameras (i.e., backup camera), side cameras, etc.

The vehicle monitored content module 220 may be configured to detect the cameras 126 associated with a vehicle 100, and may display indicators of the cameras 126 to the driver of the vehicle 100 on the display of the output system 135. The driver may then select the camera 126 whose vehicle monitored content 260 that they would like to view on the display. The vehicle monitored content module 220 may then cause the vehicle monitored content 260 from the selected camera to be displayed on the display of the output system 135. The driver may be able to adjust the vehicle monitored content 260 (e.g., change zoom level, or change picture settings) using controls provided by the vehicle monitored content module 220.

In some embodiments, when the driver indicates that they would like to view vehicle monitored content 260 by pressing a button associated with the display, initially vehicle monitored content 260 from a default camera 126 may be displayed. The driver may then choose a different camera 126 if desired using controls provide by the vehicle monitored content module 220. The default camera 126 may be set by the driver, or may be the last camera 126 that was viewed by the driver in a previous session. Similarly, the vehicle monitored content 260 from the default camera 126 may be shown with any settings or adjustments made by the driver during the previous viewing session.

The eye-gaze module 230 may be configured to track the eye-gaze of the driver of the vehicle 100 while the vehicle monitored content 260 is displayed. The eye-gaze of the driver is an area where the eyes driver of the vehicle 100 are focused. In some implementations, the eye-gaze module 230 may determine the eye-gaze of the driver of the vehicle 100 by shining a low intensity light into the eyes of the driver. At the same time, a camera or other sensor associated with the eye-gaze module 230, tracks the position of reflections of the low intensity light on the cornea and retina of the eyes of the driver. Based on the relative positions of the reflection, the eye-gaze module 230 may calculate the eye-gaze of the driver. Other methods for calculating the eye-gaze of a driver may be used.

The timer module 235 may track the time that the driver has viewed the vehicle monitored content 260 displayed by the vehicle monitored content module 220 while the vehicle 100 is being driven. As described above, the safety system 170 allows a driver to view vehicle monitored content 260 from one or more cameras 126 of the vehicle 100 while driving the vehicle 100. To minimize driver distraction while the vehicle 100 is being driven and vehicle monitored content 260 is displayed on a display inside of the vehicle 100, the timer module 235 may use a timer 270 to keep track of how long the driver of the vehicle 100 has looked at the vehicle monitored content 260 on the display. When the timer 270 expires (or reaches a maximum value), the timer module 235 may stop the vehicle monitored content 260 and may prevent further viewing of any vehicle monitored content 260 within the vehicle 100 by the driver.

The timer module 235 may use the eye-gaze determined by the eye-gaze module 230 to determine when the driver of the vehicle 100 is likely viewing the vehicle monitored content 260. For example, the timer module 235 may determine that the driver of the vehicle 100 is viewing the vehicle monitored content 260 when the eye-gaze module 230 provides an eye-gaze that is located on, or near, the display that is playing the vehicle monitored content 260.

When the eye-gaze indicates that the driver is viewing the vehicle monitored content 260, the timer module 235 may allow the timer 270 to run towards zero. When the eye-gaze indicates that the driver is not viewing the vehicle monitored content (e.g., the eye-gaze is associated with an area of the vehicle 100 other than the display), the timer module 235 may stop the timer 270. When the eye-gaze indicates that the driver is again viewing the vehicle monitored content 260, the timer module 235 may allow the timer 270 to run again. The timer 270 may run from the time at which it was previously stopped. In some implementations, the timer 270 may only run when the driver is viewing the vehicle monitored content 260 and some other condition is met. For example, the condition may be that the vehicle 100 is in motion, or that the vehicle 100 is traveling greater than a particular speed (e.g., 5 mph, 10 mph, etc.). The speed and/or conditions may be set by a user or administrator.

The length of the timer 270 may be dependent on the particular embodiment. In some embodiments, the length of the timer 270 may be static and may be set by a user or administrator. The length of the timer 270 may be based on research associated with minimizing driver distractions. Example lengths include 3 s, 5 s, 10 s, 15 s, etc.

In other embodiments, the length of the timer 270 may be dynamically determined based on one or more factors. The factors may include vehicle speed (e.g., higher vehicle speed equals shorter timers 270), driver age (e.g., very old and very young drivers may be given shorter timers 270), driver history (e.g., a driver with a history of tickets or accidents may receive a shorter timer 270 while a driver with no history of tickets or accidents may receive a longer timer 270), time of day (e.g., shorter timers 270 may be used at night than during the day), weather conditions (e.g., during snow or rain shorter timers 270 may be used), and traffic conditions (e.g., shorter timers 270 when traffic conditions are poor). Other factors may be used to set the length of the time 270.

The timer module 235 may further be configured to reset the timer 270 associated with vehicle monitored content 260 under certain circumstances. As described above, each time that the driver looks at the vehicle monitored content 260, the timer module 235 may cause the timer 270 to run towards zero. However, under certain circumstances the timer 270 may be reset back to its original value, or possibly reversed and caused to run in the opposite direction.

In one embodiment, when the eye-gaze of the driver is determined to be on the road ahead of the vehicle 100, the timer module 235 may keep track of how long the eye-gaze remains on the road. If the eye-gaze remains on the road for more than a threshold time 275, the timer module 235 may reset the timer 270 to its original value. Thus, the driver of the vehicle 100 is able to "earn" additional viewing time for the vehicle monitored content 260 by focusing their attention on the road for durations that exceed the threshold time 275.

Like the timer 270, the size or amount of the threshold time 275 may be static and set by a user or administrator. For example, the threshold time 275 may be 3 s, 5 s, 10 s, 15 s, etc. The threshold time 275 may be the same as the length of the timer 270, or shorter or longer than the timer 270. In other embodiments, the threshold time 275 may be dynamic and may be set based on a variety of factors such as vehicle speed (e.g., higher vehicle speed equals higher threshold times 275), driver age (e.g., very old and very young drivers may be given higher threshold times 275), driver history (e.g., a driver with a history of tickets or accidents may receive a higher threshold time 275 while a driver with no history of tickets or accidents may receive a lower threshold time 275), time of day (e.g., higher threshold times 275 may be used at night than during the day), weather conditions (e.g., during snow or rain higher threshold times 275 may be used), and traffic conditions (e.g., higher threshold times 275 when traffic conditions are poor). Other factors may be used to set the length of the threshold time 275.

In another embodiment, rather than reset the timer 270, when the timer module 235 determines that the eye-gaze of the driver is on the road, the timer module 235 may begin reversing or adding time back to the timer 270. In this way, the driver may receive additional time to view the vehicle monitored content 260 by focusing on the road ahead of the vehicle 100. The amount of time that the driver receives on the timer 270 for each second of focusing on the road may be set by a user or administrator. For example, the driver may receive one additional second of the timer 270 for every one second of time spent focusing on the road. As another example, the driver may receive one additional second of the timer 270 for every three seconds of time spent focusing on the road. Other ratios may be used.

Once the timer 270 expires indicating that the driver has spent too much time focusing on the vehicle monitored content 260 and not enough time on the road, the timer module 235 may cause the vehicle monitored content 260 to stop playing. The timer module 235 may then display a message to the driver telling the driver to pay more attention to the road and informing the driver that playback of the vehicle monitored content 260 has been disabled. Depending on the embodiment, the timer module 235 may disable viewing of vehicle monitored content until some amount of time has passed (e.g., one hour, two hours, one day, etc.). The amount of time may be set by a user or administrator.

Figure 3:
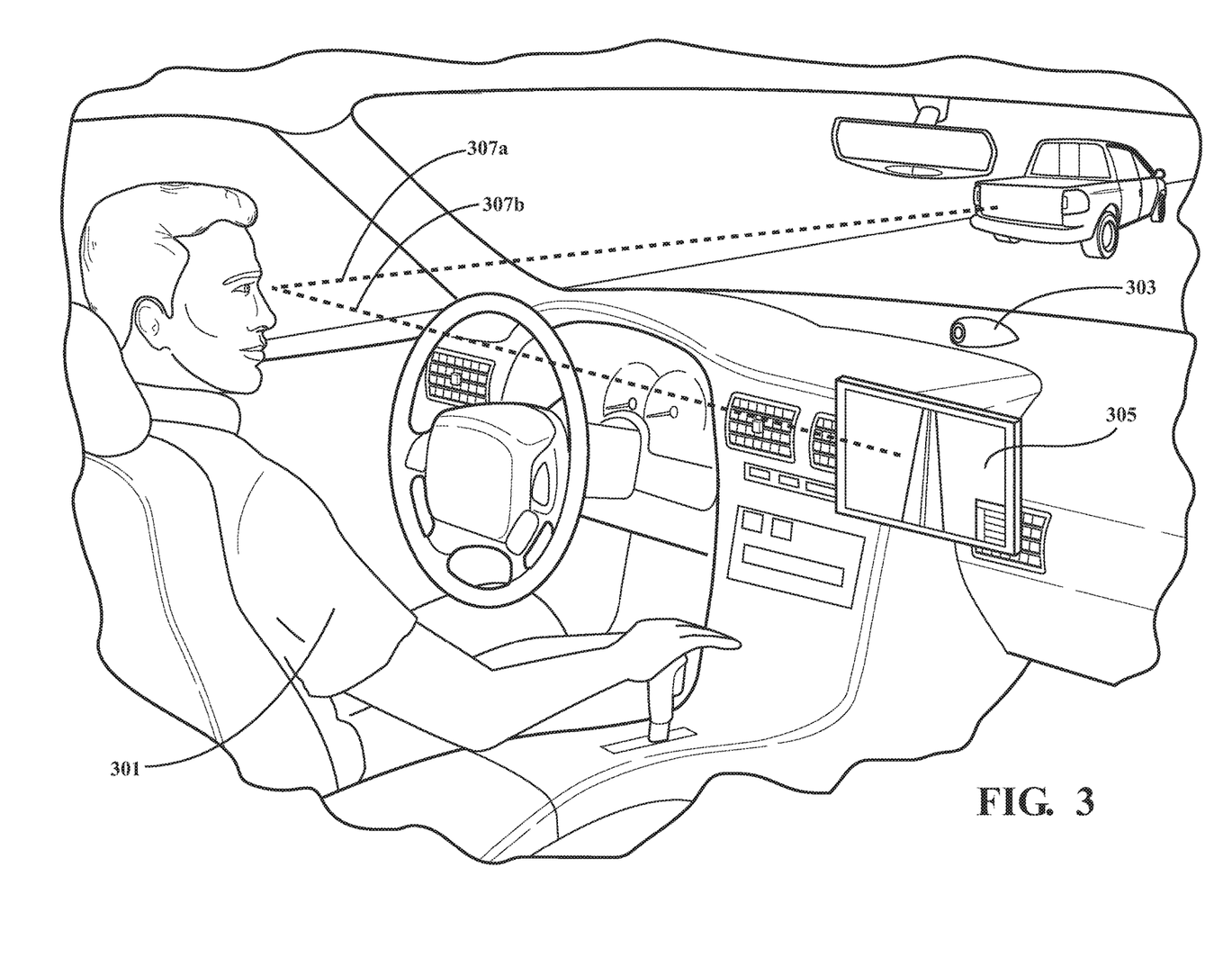
FIG. 3 illustrates an example environment implementing a safety system.

FIG. 3 illustrated an example environment implementing one embodiment of a safety system 170. As shown, a driver 301 is driving a vehicle 100 on a road. The vehicle 100 includes a display 305 that is displaying selected vehicle monitored content 260 to the driver 301. As the driver 301 drives the vehicle 100, a camera 303 tracks the eyes of the driver 301 to determine the eye-gaze of the driver. The eye-gaze 307b represents an eye-gaze that is focused on the display 305. While the eye-gaze 307a represents an eye-gaze that is focused on the road. When the eye-gaze 307b is detected by the eye-gaze module 230, the timer module 235 causes the timer 270 to run down. When the eye-gaze 307a is detected by the eye-gaze module 230, the timer module 235 stops the timer 270 and determines if the eye-gaze 307a has been detected for more than the threshold time 275. If so, the timer module 235 resets the timer 270. If the timer 270 runs down to zero, the timer module 235 prevents the vehicle monitored content 260 from being displayed on the display 305.

Figure 4:
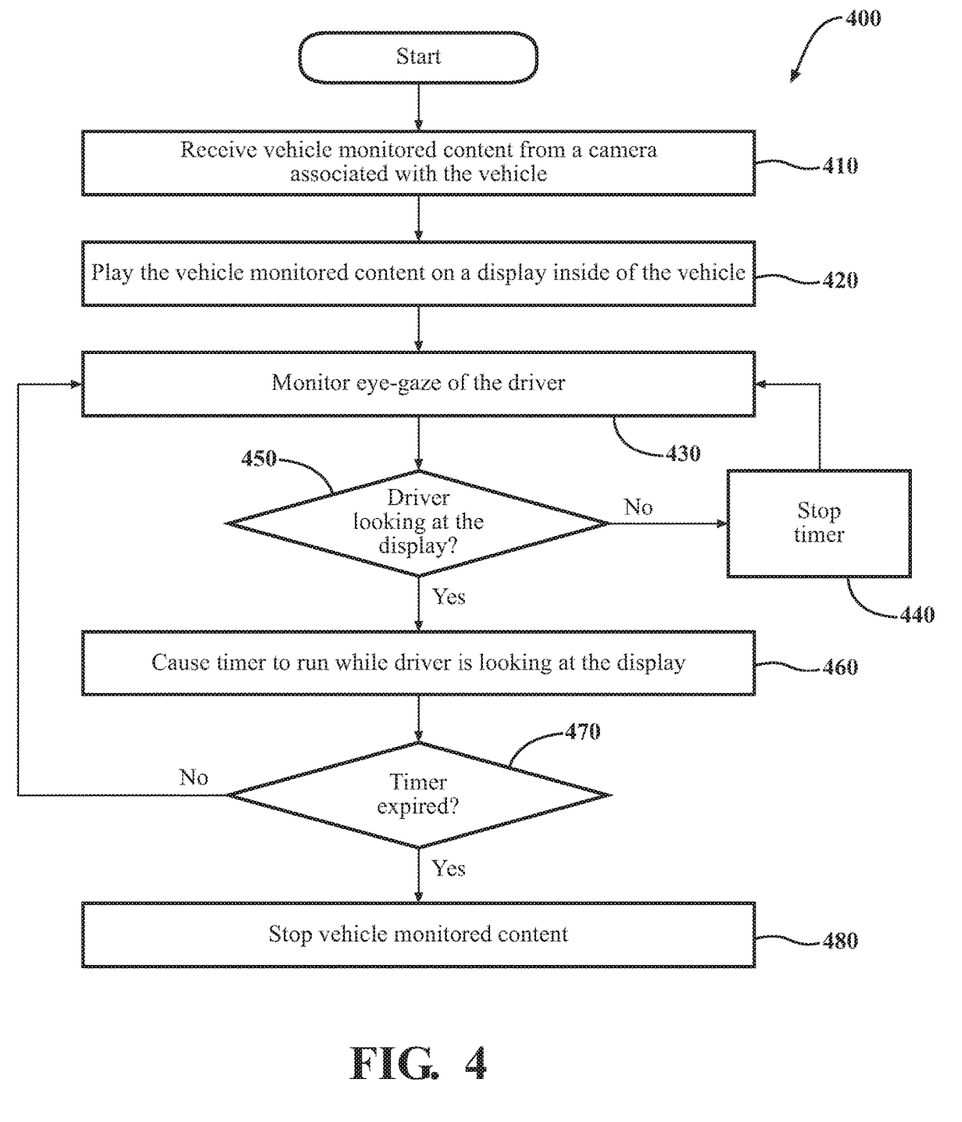
FIG. 4 illustrates a flowchart of a method that is associated with controlling the display of vehicle monitored content using a timer that is based on driver eye-gaze.

Additional aspects of vehicle safety will be discussed in relation to FIG. 4. FIG. 4 illustrates a flowchart of a method 400 that is associated with controlling the display of vehicle monitored content 260 using a timer 270 that is based on driver eye-gaze. The method 400 will be discussed from the perspective of the safety system 170 of FIGS. 1 and 2. While the method 400 is discussed in combination with the safety system 170, it should be appreciated that the method 400 is not limited to being implemented within the safety system 170 but is instead one example of a system that may implement the method 400.

At 410, the vehicle monitored content module 220 receives vehicle monitored content 260 from a camera 126 associated with the vehicle 100. The camera 126 may be a rear view camera of a vehicle 100, for example. The vehicle monitored content 260 may have been selected by a driver of the vehicle 100 to view driving the vehicle 100 on a road.

At 420, the vehicle monitored content module 220 plays the vehicle monitored content 260 on a display inside of the vehicle 100. The display may be part of the output system 135 of the vehicle 100.

At 430, the eye-gaze module 230 monitors the eye-gaze of the driver. Depending on the embodiment, the eye-gaze of the driver may be monitored by the eye-gaze module 230 using a camera or other sensor that is focused on the eyes of the driver. Any method or system for monitoring eye-gaze may be used.

At 450, the timer module 235 determines if the driver is looking at the display. The display may be the display playing the vehicle monitored content 260. The timer module 235 may determine if the driver is looking at the display based on the eye-gaze provided by the eye-gaze module 230. If the driver is looking at the display, then the method 400 may continue at 460. Else, the method 400 may continue at 440.

At 440, the timer module 235 has determined that the driver is not looking at the display, and therefore is not watching the vehicle monitored content 260. Accordingly, at 440 the timer module 235 may stop the timer 270 if the timer 270 had been running. After stopping the timer 270, the method 400 may return to 430 where the eye-gaze module 230 may continue to monitor the eye-gaze of the driver.

At 460, the timer module 235 has determined that the driver is looking at the display, and therefore is watching the vehicle monitored content 260. Accordingly, at 460 the timer module 235 may cause the timer 270 to run, or may let the timer 270 continue to run if it was already running.

At 470, the timer module 235 may determine if the timer 270 has expired. If the timer 270 has not expired, the timer module 235 may allow the vehicle monitored content 260 to continue playing and the method 400 may return to 430 where the eye-gaze of the driver may continue to be monitored. If the timer 270 has expired the method 400 may continue to 480.

At 480, the timer module 235 may stop the vehicle monitored content 260 from playing inside of the vehicle 100. In addition, the timer module 235 may display a message or warning to the driver to focus on the road.

Figure 5:
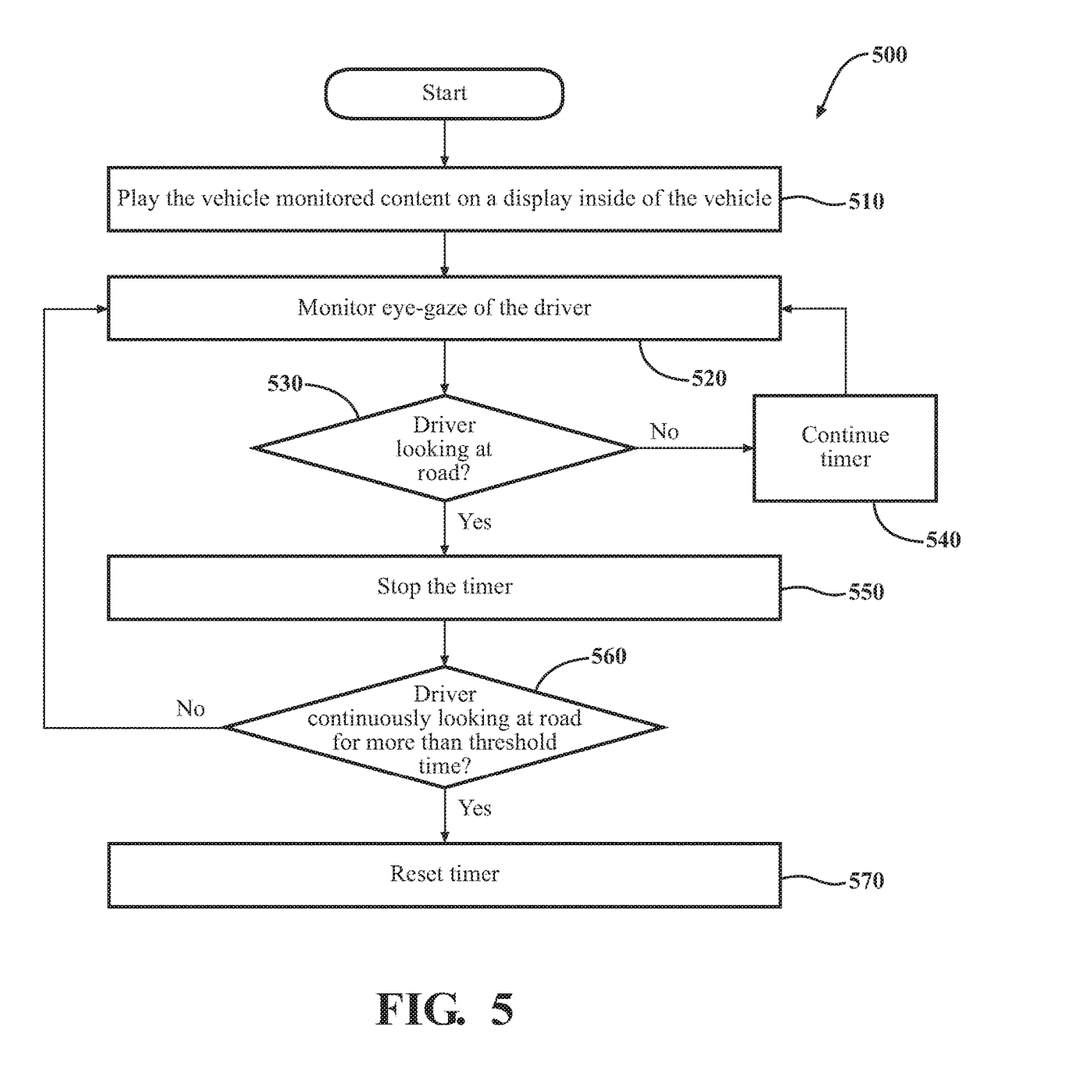
FIG. 5 illustrates a flowchart of a method that is associated with resetting a timer for vehicle monitored content based on driver eye-gaze.

Additional aspects of vehicle safety will be discussed in relation to FIG. 5. FIG. 5 illustrates a flowchart of a method 500 that is associated with resetting a timer 270 for vehicle monitored content 260 based on driver eye-gaze. The method 500 will be discussed from the perspective of the safety system 170 of FIGS. 1 and 2. While the method 500 is discussed in combination with the safety system 170, it should be appreciated that the method 500 is not limited to being implemented within the safety system 170 but is instead one example of a system that may implement the method 500.

At 510, the vehicle monitored content module 220 plays vehicle monitored content 260 on a display inside of the vehicle 100. The display may be part of the output system 135 of the vehicle 100. The vehicle monitored content 260 may be received from a camera 126 associated with the vehicle 100. The vehicle 100 may be traveling on a road.

At 520, the eye-gaze module 230 monitors the eye-gaze of the driver. Depending on the embodiment, the eye-gaze of the driver may be monitored by the eye-gaze module 230 using a camera or other sensor that is focused on the eyes of the driver of the vehicle 100. Any method or system for monitoring eye-gaze may be used.

At 530, the timer module 235 determines if the driver is looking at the road. The road may be the road that the vehicle 100 is traveling on. The timer module 235 may determine if the driver is looking the road based on the eye-gaze provided by the eye-gaze module 230. If the driver is looking the road, then the method 500 may continue at 550. Else, the method 500 may continue at 540.

At 540, the timer module 235 has determined that the driver is not looking at the road, and therefore is likely watching the vehicle monitored content 260. Accordingly, at 540 the timer module 235 may allow the timer 270 to continue running. The method 500 may then return to 520 where the eye-gaze module 230 may continue to monitor the eye-gaze of the driver.

At 550, the timer module 235 has determined that the driver is looking at the road, and therefore is not watching the vehicle monitored content 260. Accordingly, at 550 the timer module 235 may cause the timer 270 to stop.

At 560, the timer module 235 may determine if the driver has been looking at the road for more than a threshold amount of time. If the driver has been looking at the road for more than the threshold amount of time, the method 500 may continue at 570. Else, the method 500 may return to 520 where the eye-gaze of the driver may continue to be monitored.

At 570, the timer module 235 may reset the timer 270. In addition, the timer module 235 may display a message or warning to the driver to focus on the road. After resetting the timer 270, the method 500 may return to 520 where the eye-gaze of the driver may continue to be monitored.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the safety system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the safety system 170, and/or the autonomous driving module(s) 160 may control some or all of these vehicle systems 140 and, thus, may be partially or fully autonomous.

The processor(s) 110, the safety system 170, and/or the autonomous driving module(s) 160 can be operatively connected to communicate with the various vehicle systems 140 and/or individual components thereof. For example, returning to FIG. 1, the processor(s) 110, the safety system 170, and/or the autonomous driving module(s) 160 can be in communication to send and/or receive information from the various vehicle systems 140 to control the movement, speed, maneuvering, heading, direction, etc. of the vehicle 100. The processor(s) 110, the safety system 170, and/or the autonomous driving module(s) 160 may control some or all of these vehicle systems 140.

The processor(s) 110, the safety system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the safety system 170, and/or the autonomous driving module(s) 160 can control the direction and/or speed of the vehicle 100. The processor(s) 110, the safety system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the safety system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for playing vehicle monitored content in a vehicle comprising:
one or more processors; and
a memory communicably coupled to the one or more processors and storing:
a vehicle monitored content module including instructions that when executed by the one or more processors cause the one or more processors to:
play vehicle monitored content on a display inside of the vehicle;
an eye-gaze module including instructions that when executed by the one or more processors cause the one or more processors to:

monitor an eye-gaze of a driver of the vehicle; and
a timer module including instructions that when executed by the one or more processors cause the one or more processors to:
when the eye-gaze indicates that the driver is looking at the display, determine that a timer is not expired and, in response to a determination that the timer is not expired, cause the timer to run;
when the eye-gaze indicates that the driver is not looking at the display and the timer is not expired, cause the timer to stop;
determine that the timer has expired; and
in response to a determination that the timer has expired, stop the vehicle monitored content from playing on the display inside of the vehicle, wherein a length of the timer is dynamically determined to have an inverse relationship with at least one of a driver age or a count of a number of citations issued to the driver for infractions of traffic regulations.

2. The system of claim 1, wherein the eye-gaze module further includes instructions that when executed by the one or more processors cause the one or more processors to:
when the eye-gaze indicates that the driver is looking at a road ahead of the vehicle:
determine that the driver has been continuously looking at the road ahead for more than a threshold time; and
in response to a determination that the driver has been continuously looking at the road ahead for more than the threshold time, reset the timer.

3. The system of claim 2, wherein the threshold time is three seconds.

4. The system of claim 1, wherein the length of the timer is three seconds.

5. The system of claim 1, wherein the instructions to play the vehicle monitored content include instructions to stream the vehicle monitored content from a camera associated with the vehicle.

6. The system of claim 1, wherein:
the vehicle monitored content module further includes instructions that when executed by the one or more processors cause the one or more processors to receive a selection of a camera of a plurality of cameras associated with the vehicle; and
the instructions to play the vehicle monitored content include instructions to play the vehicle monitored content associated with the camera inside the vehicle.

7. The system of claim 1, wherein the timer module further includes instructions that when executed by the one or more processors cause the one or more processors to:
in response to a determination that the timer has stopped, display a reminder to the driver of the vehicle to watch a road.

8. A method for playing vehicle monitored content in a vehicle, the method comprising:
playing, by a processor, vehicle monitored content on a display inside the vehicle;
monitoring, by the processor, eye-gaze of a driver of the vehicle;
when the eye-gaze indicates that the driver is looking at the display, determining, by the processor, that a timer is not expired and, in response to a determination that the timer is not expired, causing the timer to run;
when the eye-gaze indicates that the driver is not looking at the display and the timer is not expired, causing, by the processor, the timer to stop;
determining, by the processor, that the timer has expired; and
in response to a determination that the timer has expired, stopping, by the processor, the vehicle monitored content from playing on the display inside of the vehicle, wherein a length of the timer is dynamically determined to have an inverse relationship with at least one of a driver age or a count of a number of citations issued to the driver for infractions of traffic regulations.

9. The method of claim 8, further comprising:
when the eye-gaze indicates that the driver is looking at a road ahead of the vehicle:
determining, by the processor, that the driver has been continuously looking at the road ahead for more than a threshold time; and
in response to a determination that the driver has been continuously looking at the road ahead for more than the threshold time, resetting, by the processor, the timer.

10. The method of claim 9, wherein the threshold time is three seconds.

11. The method of claim 8, wherein the length of the timer is three seconds.

12. The method of claim 8, wherein the playing the vehicle monitored content comprises streaming the vehicle monitored content from a camera associated with the vehicle.

13. The method of claim 8, further comprising receiving, by the processor, a selection of a camera of a plurality of cameras associated with the vehicle, wherein the playing the vehicle monitored content comprises playing the vehicle monitored content associated with the camera inside the vehicle.

14. The method of claim 8, further comprising:
in response to a determination that the timer has stopped, displaying, by the processor, a reminder to the driver of the vehicle to watch a road.

15. A non-transitory computer-readable medium for playing vehicle monitored content in a vehicle including instructions that when executed by one or more processors cause the one or more processors to:
play vehicle monitored content on a display inside the vehicle;
monitor eye-gaze of a driver of the vehicle;
when the eye-gaze indicates that the driver is looking at the display, determine that a timer is not expired and, in response to a determination that the timer is not expired, cause the timer to run;
when the eye-gaze indicates that the driver is not looking at the display and the timer is not expired, cause the timer to stop;
determine that the timer has expired; and
in response to a determination that the timer has expired, stop the vehicle monitored content from playing on the display inside of the vehicle, wherein a length of the timer is dynamically determined to have an inverse relationship with at least one of a driver age or a count of a number of citations issued to the driver for infractions of traffic regulations.

16. The non-transitory computer-readable medium of claim 15, further comprising instructions that when executed by the one or more processors cause the one or more processors to:
when the eye-gaze indicates that the driver is looking at a road ahead of the vehicle:
determine that the driver has been continuously looking at the road ahead for more than a threshold time; and in response to a determination that the driver has been continuously looking at the road ahead for more than the threshold time, reset the timer.

17. The non-transitory computer-readable medium of claim 16, wherein the threshold time is three seconds.

18. The non-transitory computer-readable medium of claim 15, wherein the length of the timer is three seconds.

19. The non-transitory computer-readable medium of claim 15, wherein the vehicle monitored content is streamed from a camera associated with the vehicle.

20. The non-transitory computer-readable medium of claim 15, further comprising instructions that when executed by the one or more processors cause the one or more processors to:
   receive a selection of a camera of a plurality of cameras associated with the vehicle; and
   the instructions to play the vehicle monitored content include instructions to play the vehicle monitored content associated with the camera inside the vehicle.

* * * * *